Patented May 13, 1952

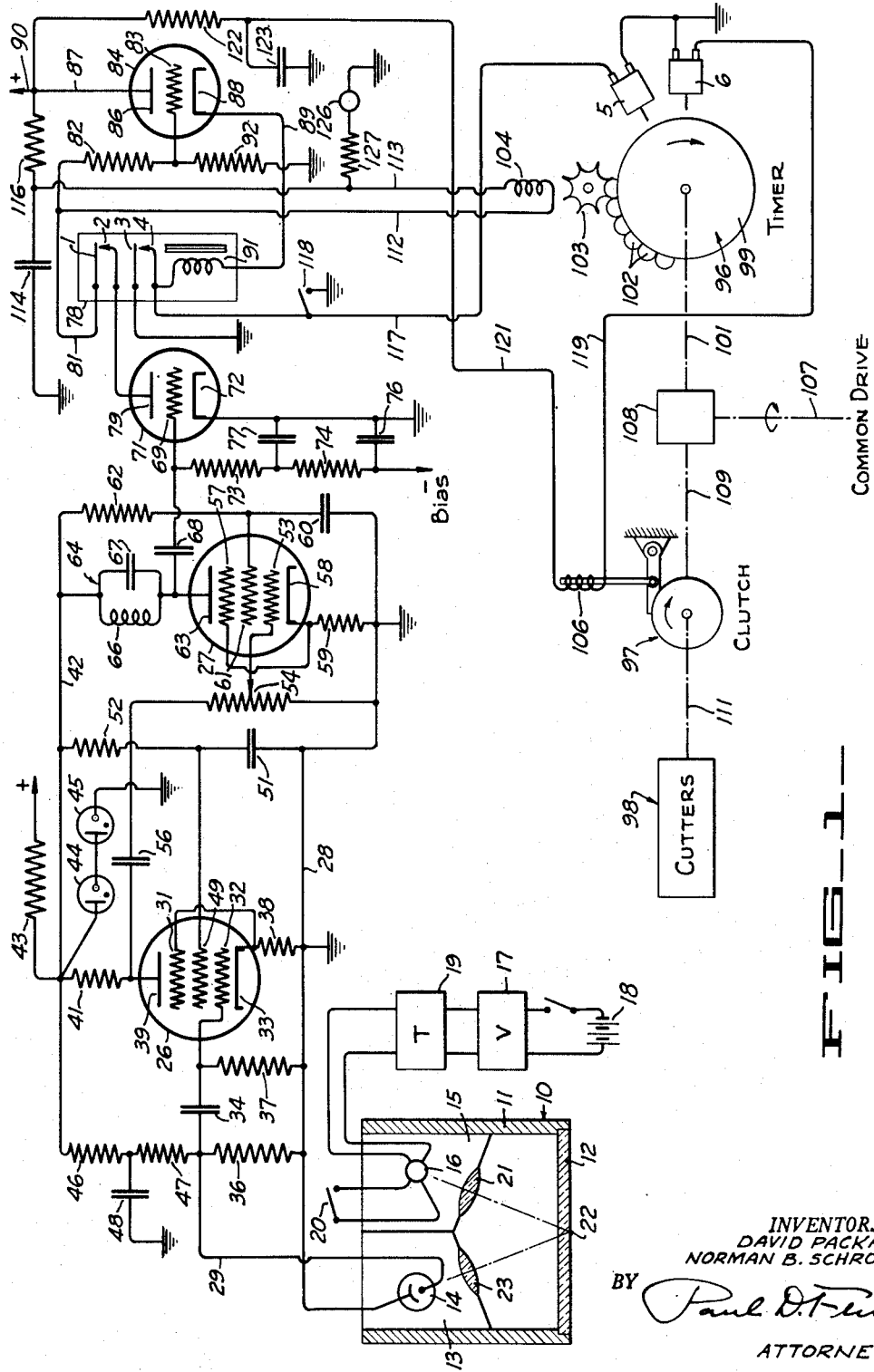

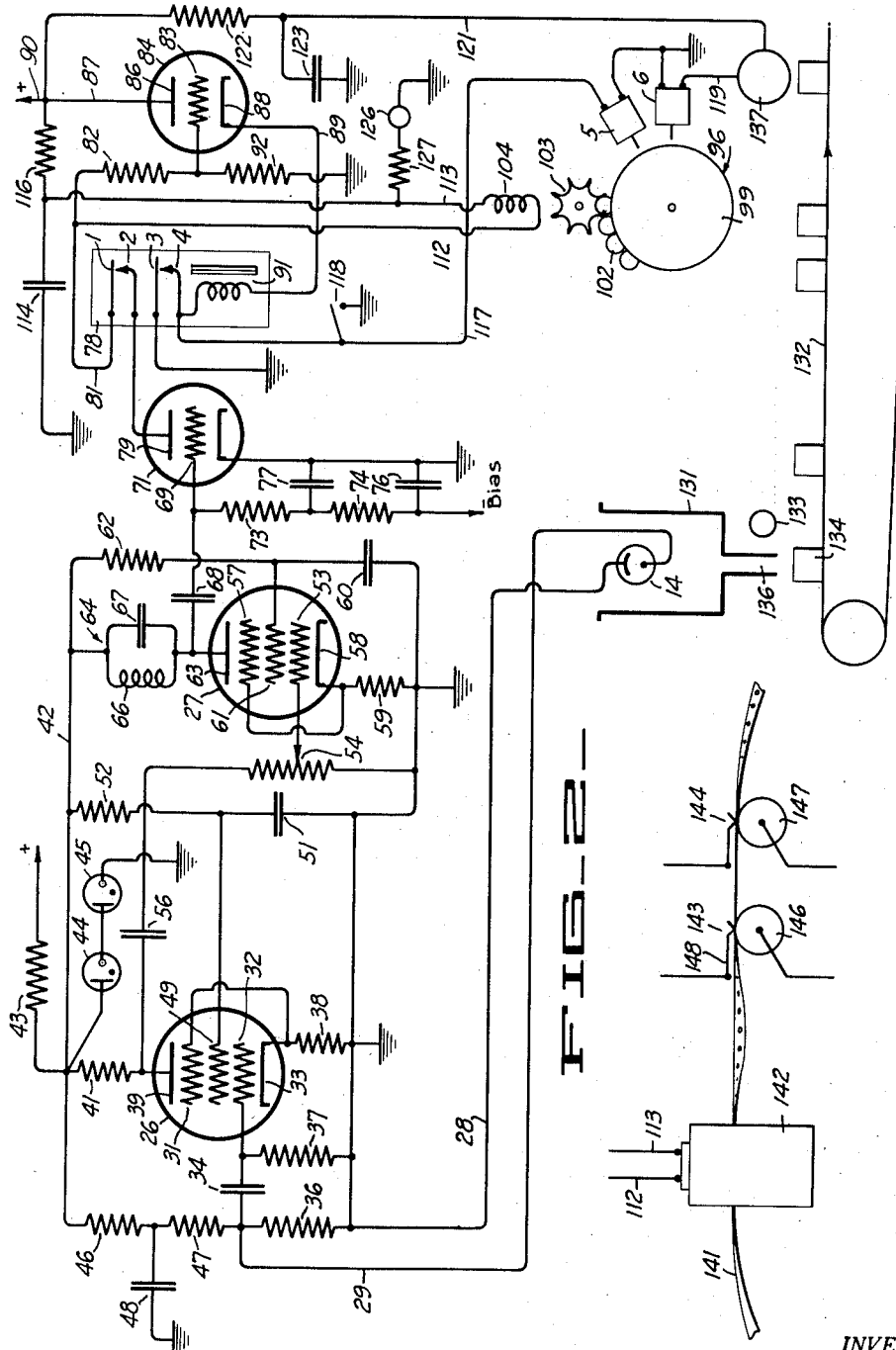

2,596,591

UNITED STATES PATENT OFFICE 2,596,591

PHOTOELECTRIC SYSTEM

David Packard, Los Altos, and Norman B. Schrock, Palo Alto, Calif., assignors, by mesne assignments, to Hewlett-Packard Company, Palo Alto, Calif., a corporation of California Application November 2, 1946, Serial No. 707,510

5 Claims. (Cl. 250—224)

In many machines and industrial operations it is desirable to make use of a photoelectric tube for controlling the operation of one or more devices. Referring particularly to the agricultural field Marihart Patent No. 2,400,562 discloses a machine capable of operating automatically to thin out plants located in a row. Briefly the machine utilizes a photoelectric cell which passes over a row of plants and which locates or receives a light indication from plants which are in sufficiently good condition with respect to size as to be left standing after the thinning operation. The photoelectric cell in turn serves to operate means whereby cutters are operated in such a fashion as to thin out or eradicate plants between the selected plants in good condition which are left standing. In copending application Serial No. 707,438, filed simultaneously herewith, an improvement to the machine in said Patent No. 2,400,562 is disclosed, in which the cutting means is simplified, and in which the minimum spacing of the plants left standing is controlled without however placing a maximum distance between the space between plants.

The present invention has for its object the production of an electronic system which is particularly adapted for use with agricultural machines of the type described above.

A further object of the invention is to provide an electronic system of the above character which will not be affected by daylight or other extraneous sources of light.

A further object of the invention is to provide an electronic system of the above character which includes and cooperates with time delay means and a solenoid operated clutch which in turn carries out certain cyclic functioning of the machine, as for example the cycling of the cutters.

Another object of the invention is to provide a novel electronic system of general industrial application which is particularly adapted to control operation of one or more devices in accordance with light responses received by a photoelectric tube, and with a time delay.

Further objects of the invention will appear from the following description in which the preferred embodiment has been set forth in detail in conjunction with the accompanying drawing.

Referring to the drawing.

Figure 1 is a circuit diagram illustrating one form of the invention.

Figure 2 is a circuit diagram illustrating another form of the invention.

Figure 3 illustrates diagrammatically a time delay device of the perforated tape type.

Figure 1 shows a circuit diagram for the electrical parts of the system and also diagrammatically illustrates certain parts of an agricultural machine. A device 10 is provided which is adapted to be traversed adjacent the objects from which a light response is desired. For a thinning machine this can be plant portions indicative of the location of the central axis of the plants, as for example the stem portions of young lettuce plants. Such a device can consist of the housing 11 formed of opaque walls, and having a transparent plate 12 of suitable material such as glass extending over its lower end. Within the housing there is a compartment 13 serving to accommodate the photoelectric cell or tube 14. Another compartment 15 serves to accommodate the illuminating lamp 16, which has characteristics such that it will supply pulsating light in response to alternating current excitation. The photoelectric tube should be selected to have characteristics dependent upon the characteristics of the reflected light received, and can for example be a tube known by manufacturer's specifications as No. PJ22. The light source 16 can be a glow discharge tube of the fluorescent type. The lamp is energized from a suitable source of alternating current, which can be supplied for example by vibrator 17 operating from battery 18, and having its pulsating output stepped up to proper voltage by the transformer 19. A suitable starting switch 20 can be connected to the lamp 16, whereby after voltage is supplied the lamp is started in operation by temporarily closing the switch 20.

A suitable lens 21 such as one of the cylindrical type is provided for generally focusing light from the lamp upon a localized region adjacent the lower face of the glass plate 12, as for example the region indicated at 22. This region can extend laterally across the plate as disclosed in said application Serial No. 707,438. Lens 23 also serves to direct reflected light upon the photoelectric tube 14 whereby the tube views portions of plants passing across the plate and the viewing region 22. The greater area of the plate 12 can be masked off by suitable means such as an opaque coating, leaving only a localized transparent portion in the form of a laterally extending slot through which light from the source may pass and from which reflected light may pass to the photoelectric tube. As disclosed in the aforesaid co-pending application Serial No. 707,438 in the use of the device 10 it is traversed along the row of plants and the lower face of the plate 12 brought into wiping contact with the plant foliage. Thus the light indication can be secured from a portion of the plant which is properly indicative of the plant location, as for example the bent over stem portions of plants like lettuce, or such other portions of the plant foliage as may be adjacent to the central axis of the plant.

The electronic amplifying means which is connected to the photoelectric tube 14 includes the cascade connected vacuum tubes 26 and 27. The particular tubes illustrated are of the triple grid amplifier type, such as tubes known by manufacturers' specifications as No. 6SJ7. Resistance coupling is provided between the photoelectric tube 14 and the input of tube 26. Conductor 28 is connected to the cathode of the photoelectric tube 14 and is grounded. Conductor 29 connects the anode of tube 14 to the grid 32, in series with the coupling condenser 34. Coupling resistor 36 connects across conductors 28, 29 and a leak resistor 37 connects between conductor 28 and the grid 32. The cathode 33 and grid 31 are connected to ground through the biasing resistor 38.

The anode 39 of tube 26 is connected in series with the resistor 41 to the conductor 42, which in turn is connected to a source of plate supply voltage through the resistor 43. In a typical instance the voltage of the plate supply can be of the order of 350 volts. Conductor 42 connects to ground through the series connected voltage regulating tubes 44, 45. These tubes can be of the type known by manufacturers' specifications as VR150. Voltage is applied to the anode of the photoelectric tube 14 by means of the resistors 46 and 47, which function as a filter in conjunction with condenser 48, and as a voltage divider in conjunction with resistor 36.

The second grid 49 of the tube 26 is connected to ground through the by-pass condenser 51, and is also connected to conductor 42 through the resistor 52, whereby a suitable voltage is maintained upon the grid.

The vacuum tube 27 has its grid 53 connected to an adjustable tap on resistor 54, which in turn has its one end grounded, and its other end connected to the plate 39 of tube 26 through the series coupling condenser 56. Adjusting the setting of the tap on resistor 54 serves as a sensitivity adjustment. The grid 57 of tube 27 connects with the cathode 58, and thence to ground through the resistor 59. Grid 61 connects to ground through the by-pass condenser 60, and to the conductor 42 through the resistor 62, whereby a suitable voltage is maintained upon the grid with respect to the potential maintained on the cathode. The plate 63 of tube 27 is connected to the conductor 42 through a suitable tuned circuit 64 consisting for example of the inductance 66 and shunt capacitance 67. This circuit is tuned to the frequency of the light source whereby the amplifying system is responsive only to pulsations of substantially the same frequency.

Condenser 68 serves to couple the plate 63 of tube 27 to the grid 69 of another tube 71. This tube can be of the thyratron type such as a three element tube known by manufacturers' specifications as No. 884, or a tube of the shielded grid type known as No. 2050. The cathode 72 of thyratron 71 is grounded as indicated, and the grid is connected to a suitable source of negative bias through the series resistors 73, 74. Condensers 76, 77 are shown connected from the negative bias to ground, and from the mid-connection between resistors 73, 74 and ground.

In conjunction with the thyratron 71 there is a relay 78 provided with two sets of contacts 1, 2 and 3, 4. A stationary contact 2 connects to the plate 79 of thyratron 71. The cooperating movable contact 1 is connected by conductor 81 and the series resistor 82 to the grid 83 of another vacuum tube 84. This tube can be of the triode amplifier type such as a tube known by manufacturers' specifications as No. 6J5. The plate 85 of this tube is connected by conductor 87 to a suitable source of plate battery voltage, such as a voltage of the order of 250 volts. The voltage source in this instance is represented by the conductor 90 and may for example be a battery or a rectifier and filter. The cathode 88 is connected by conductor 89 to one terminal of the coil 91 of relay 78. The other side of this coil connects to the stationary contact 4. Grid 83 is also connected to ground through the leak resistor 92.

In conjunction with the parts described above I have diagrammatically shown a timing device 96, a clutch 97, and machine elements identified as cutters 98. The timer can be of the type disclosed in Marihart application Serial No. 651,663, now Patent No. 2,437,168, filed March 2, 1946. Briefly it consists of a wheel 99 mounted upon the rotating shaft 101, and having a plurality of lugs or buttons 102 frictionally retained upon its periphery. Normally the buttons 102 are held stationary by the star retention wheel 103, which in turn is controlled by a ratchet and pawl, the pawl being released by energizing the solenoid coil 104. Thus when the solenoid coil 104 is energized star wheel 103 is permitted to rotate a fraction of a revolution to permit the foremost button to travel with the wheel 99, until it again returns to the row of stationary buttons illustrated. Located in the path of movement of the buttons are two switches 5 and 6, which can be of the micro-switch type, and which are successively operated by a button passing in juxtaposition to the same.

The clutch 97 can be of the self cycling type such as disclosed for example in Marihart application Serial No. 611,311, now forfeited, filed August 18, 1945. It is released by energizing the solenoid coil 106.

A common drive shaft 107 is shown for the mechanical parts described above. In an agricultural machine of the type disclosed in application Serial No. 707,438 this shaft can be driven in synchronism with forward movement of the vehicle. Suitable interconnecting drive means 108 is shown diagrammatically between shaft 107, the shaft 101 for the timing wheel 99, and the shaft 109 of the clutch 97. When the clutch is released it serves to effect cyclic rotation of shaft 111 to which the cutters 98 are applied. In a typical instance the clutch 97 after being released will cause rotation of shaft 101 one-quarter a revolution, before the clutch automatically releases itself and arrests further rotation.

The release coil 104 of the timer has its one terminal connected by conductor 112 to conductor 81, and thus to the movable contact 1, and its other terminal connected by conductor 113 to one side of a current supply condenser 114, the other side of which is grounded. Conductor 113 also connects to conductor 81 through the resistor 116.

Switch 5 has its one side grounded and its other side connected by conductor 117 to the stationary contact 4 of the relay. In addition this conductor is connected to one side of a simple push button or switch 118, the other side of which is grounded.

Switch 6 has its one side grounded and its other side connected by conductor 119 to one terminal of the clutch release solenoid 106. The other side of this solenoid is connected by conductor 121 to conductor 87 and to the plate current supply of tube 84 through the series resistor 122. Also conductor 121 is connected to one side of the current supply condenser 123, the other side of which is grounded.

A small signal or indicator lamp 126 of the neon or glow discharge type is shown connected between conductor 113 and ground, in series with a resistor 127.

It will be apparent that the values of the different elements of the electrical system described above may be varied to suit different operating conditions and to attain characteristics desired in particular instances. In one instance the lamp 16 was energized with alternating current at a frequency of 115 cycles, produced by a vibrator operating at the same frequency. This provided a light source pulsating at a frequency of 230 cycles. Circuit 64 was sharply tuned to the frequency of 230 cycles thereby rendering the system virtually immune to reflected light other than that produced by the pulsating light source. The various resistors and condensers included in the network had values as follows: Resistors 36, 37, 46 and 47, 2 megohms; resistor 38, 1200 ohms; resistor 43, 7500 ohms; condenser 48, 20 mfd.; resistor 41, 220,000 ohms; condenser 34 and 56, 0.01 mfd.; condenser 51, 20 mfd.; resistors 52 and 54, 1 megohm; resistor 59, 500 ohms; condenser 60, 20 mfd.; resistor 62, 150,000 ohms; resistor 73, 100,000 ohms; resistor 74, 10,000 ohms; condenser 76, 0.25 mfd.; condenser 77, 0.025 mfd.; condenser 68, 0.01 mfd.; condenser 114, 20 mfd.; resistor 116, 5,000 ohms; resistor 122, 5,000 ohms; resistor 62, 150,000 ohms; resistor 92, 200,000 ohms; condenser 123, 30 mfd.; and resistor 127, 100,000 ohms.

Operation of the apparatus described above can be outlined as follows: Assuming use with an agricultural machine of the type disclosed in said application 707,438, the unit 10 which carries the source of light and the photoelectric tube is arranged to pass over a row of plants in such a manner that the plants wipe against the lower side of the transparent plate 12. The drive 108 to the timer 96 and to the clutch 97 is synchronized with forward movement of the machine. The lamp 16 is started in operation by temporarily closing the starting switch 20. Switch 118 is then momentarily closed to energize coil 91 by current supplied from the cathode of the tube 84. Closing of the contacts of this relay causes the relay to be locked closed because the closing of contacts 3 and 4 completes a holding circuit to ground through coil 91. The grid 69 of the thyratron 71 is biased at this time in such a manner that the plate to cathode impedance is relatively high. The plate current source connected to conductor 87 charges condenser 114 through resistor 116, and also charges condenser 123 through resistor 122. As long as condenser 114 is charged the small neon indicator lamp 126 is illuminated. Assuming now that a plant passing underneath the plate 12 causes a reflected light indication to fall upon the photoelectric tube 14, a number of impulses of a frequency corresponding to the frequency of the light impulses (i. e. 230 cycles per second) is impressed upon the input of the amplifier tube 26. Amplified impulses are impressed upon the input of the amplifier tube 27. The amplification system is responsive only to impulses of the light frequency because of the action of the resonant circuit 64. When tube 27 receives such an impulse plate 63 assumes a potential differing from the potential on the thyratron grid 69, and therefore the potential of the thyratron grid is changed whereby the thyratron is fired, or in other words the plate to cathode impedance reduced to a relatively low value. When this occurs the condenser 114 discharges through a circuit including the timer coil 104, relay contacts 1 and 2, and the plate to cathode path of the thyratron, to effect release of the star wheel 103 to release one of the buttons 102. Discharge of the condenser 114 as described causes the lamp 126 to be extinguished.

Simultaneously with discharge of condenser 114 the potential of conductor 81 and grid 83 of tube 84 is reduced from a relatively high positive value of the order of say 200 volts, to a relatively low value. This serves to block the plate current of tube 84, or in other words to provide a relatively high plate to cathode impedance. As a result flow of holding current through the relay coil 91 is interrupted or reduced to a relatively low value, whereby the contacts of the relay are released. Release of the relay renders the network inoperative insofar as any further pulses from the photoelectric cell 14 are concerned. Upon release of the relay 78 the opening of contacts 1 and 2 permits the grid 83 of tube 84 to again assume a relatively high positive value, with the result that the plate to cathode impedance of this tube is again made relatively low.

When the released button 102 has traveled sufficiently far to operate the switch 5, closing of this switch establishes a current flow through coil 91 of the relay, with the result that the relay is again closed and thus causes the apparatus to be conditioned for response to another light impulse. When the released button reaches and operates the switch 6, a circuit is closed which includes the coil 106 and the condenser 123, whereby this condenser discharges through the coil 106 to release the clutch 97. Release of this clutch permits the cyclic operation of the cutters 98 to perform for example a thinning operation. Immediately upon discharge of condensers 114 and 123 in the manner described above, they are recharged by current supplied from the plate current supply connected to conductor 87.

In the above described cycle of operations it will be noted that the apparatus is made inoperative to further impulses immediately after an impulse has been received to effect operation of the timer release coil 104. This affords a time interval during which the machine as a whole is traveling forwardly with respect to the row of plants, and until the released button operates the switch 5. Thus the interval of inoperativeness provided in this fashion provides a minimum space interval between cyclic operations of the cutting means 98.

The electronic system described above is relatively efficient in the amplification of electrical pulses produced upon the receipt of reflected light by the photoelectric tube. The thyratron provides a simple and effective means for controlling the discharge of condenser 114 in response to applied impulses. Tube 84 provides in effect a means for controlling release of the relay responsive to firing of the thyratron.

While my system has particular application to agricultural machines of the type described above where it is necessary to control certain machine operations responsive to light indications received from plants, the system can be used to advantage for a wide variety of industrial applications. In many machines and industrial applications it is desirable to control certain machine operations in a sequential order responsive to operation of the photoelectric tube. Figure 2 represents one such industrial application where articles are being carried by a continuously moving conveyor and are being operated on as by paint spraying devices, heating means for heat treatment, etc. Thus in this instance the photoelectric tube 14 is shown positioned within a suitable housing 131 which is operatively positioned with respect to a continuously moving conveyor 132 of the endless belt type. A source of interrupted or pulsating light such as a lamp 133 is positioned in such a manner as to illuminate the objects 134 being moved by the conveyor whereby as the objects pass through a specified position with respect to the photoelectric tube, light is reflected through the opening 136 to operate the amplifying system in the manner previously described.

In place of the solenoid coil 106 conductors 119 and 121 are shown connected to a device 137 which is representative of paint spraying means, heating means, etc. for performing a desired operation upon the objects 134. The timer wheel 99 can be driven at a constant speed commensurate with the driving of the conveyor and the extent of time delay desired.

The system of Figure 2 operates as follows: The conveyor 132 operates at a constant rate and it is assumed that the objects 134 are placed upon the conveyor in single file but indiscriminately as to spacing. As each object reaches a predetermined position with respect to the photoelectric tube 14 the tube receives a light response in the manner described above. The light response in turn operates the trip coil 104 of the timer to release one of the timing elements 102. The released timing element immediately commences to travel about the axis of timer wheel 99 to effect operation of the switches 5 and 6. Operation of switch 6 serves to supply current to device 137 whereby this device performs operations on the same object which instigated that particular light response. Assuming that a number of objects are traveling between the location of the photoelectric tube and the location of the device 137, a corresponding number of timing elements 102 will be traveling between their points of release and the switch 6. The spacing of these timing elements during their travel will correspond to the spacing between the objects 134.

In place of using a timer such as shown in Marihart Serial No. 651,663, now patent No. 2,437,168, it is possible to utilize other types of time delay devices such as a paper tape perforator operating upon a tape which is moved at a constant rate, in conjunction with contacting means through which the tape passes and which effects opening and closing of contacts in accordance with the perforations. Thus as indicated diagrammatically in Figure 3 a paper tape 141 can be fed at a constant rate to a perforator 142, which has its operating coil connected to the conductors 112, 113 in place of the coil 104 of Figure 1. Thus a perforation is placed in the tape for each current pulse received. The tape is shown passing at the same constant rate through the contacting devices 143, 144 which correspond to the micro switches 5 and 6 of Figure 1. These switches make use of contacting rollers 146 and 147 in conjunction with the contact fingers or brushes 148, 149. It will be evident that a timer of this type will give the same time delay as the timer described above and illustrated in Figures 1 and 2, and in some instances may be desirable where it is necessary to store a considerable number of actuating pulses.

While it is desirable to utilize a source of light formed by a fluorescent type of tube energized by alternating or pulsating current, it will be understood that other types of recurrently interrupted light can be employed. For example we can employ a constant source of light such as is provided by an incandescent filament type lamp together with a mechanical chopper or shutter for interrupting the light at regular intervals.

We claim:

1. In an electrical system for effecting operations in response to receipt of pulsating light reflected from objects, a photoelectric tube adapted to receive pulsating light reflected from objects, electronic amplifying means having its input coupled to the photoelectric tube, said amplifying means being tuned to respond to electrical pulses of the same frequency as the frequency of the light pulsations, a pair of devices adapted to be energized in response to receipt of light pulsations by the photoelectric tube, one of said devices being a timer having a winding adapted to be energized and provided with two sets of switch contacts adapted to be successively operated within predetermined intervals following energization of said winding, the other of said devices having a winding adapted to be energized, a thyratron having plate, cathode and control grid elements, means serving to couple the grid of the thyratron to the output of the amplifying means, a relay having a winding adapted to be energized to operate the contacts of the same, a vacuum tube having plate, cathode and control grid elements, an energizing circuit for the winding of the timing device including a condenser adapted to be charged together with one set of contacts of said relay and the plate and cathode path of the thyratron, means serving to couple the control grid of said vacuum tube to said same set of contacts of the relay whereby when said contacts are closed said control grid is connected to the plate of the thyratron, means forming an energizing circuit for the winding of said other device including the second contacts of the timing device together with a condenser adapted to be charged, means serving to supply charging current to both said condensers and to the plates of the thyratron and vacuum tube, a circuit for the winding of the relay including said first named switch contacts of the timing device and the plate to cathode path of said vacuum tube, and a holding circuit for said winding likewise including the plate to cathode path of said vacuum tube together with a second set of contacts of the relay, said thyratron operating responsive to the receipt of amplified pulses from the amplifying means to effect discharge of one of said condensers through the winding of the timing device, after which the winding of the relay is deenergized and the system made inoperative until closing of the first set of switch contacts of the timing device.

2. In an electrical system for effecting operations in response to receipt of light pulsations, a photoelectric tube adapted to receive light pulsations, electronic amplifying means having its input coupled to the photoelectric tube, two devices adapted to be operated in response to receipt of light pulsations by the photoelectric tube, one of said devices being a timer, a thyratron, an energizing circuit for the timing device including a condenser adapted to be discharged and the plate to cathode path of the thyratron, means serving to couple the control grid of the thyratron to the output of the amplifying means, said timing device including contacts adapted to be closed upon lapse of a predetermined period of time following actuation of said device, an energizing circuit for the second device including said last named contacts and a condenser adapted to be charged, and means for supplying charging current to both of said condensers.

3. In an electrical system for effecting operations in response to light reflected from plants, a device adapted to be traversed along a row of plants, a source of light carried by said device and serving to subject portions of said plants to pulsating light, a photoelectric tube carried by said device and arranged to receive light pulsations reflected from said plant portions, electronic amplifying means having its input coupled to the photoelectric tube and being responsive to pulses of the same frequency as the frequency of the light pulsations, a timing device including a winding adapted to be energized, said timing device including electrical contacts adapted to be operated a predetermined time interval after energization of said winding, means including another device actuated responsive to operation of said contacts, and means coupled to the output of said amplifying means and serving to effect energization of the winding of the timing device responsive to receipt of light pulsations by the photoelectric tube.

4. In an electrical system for effecting operations in response to receipt of light reflected from objects, a source of periodically pulsating light of constant frequency, a photoelectric tube adapted to receive light from said source after reflection of such light from an object, electronic amplifying means having its input coupled to the photoelectric tube, said amplifying means being tuned to respond to electrical pulses of the same frequency as the frequency of the light pulsations, two devices adapted to be energized in response to receipt of light pulses by the photoelectric tube, one of said devices being a timing device and the second of said devices being means for effecting machine operations, a thyratron, an energizing circuit for the timing device including a condenser adapted to be discharged and the plate to cathode path of the thyratron, means serving to couple the control grid of the thyratron to the output of the amplifying means, said timing device including contacts adapted to be closed upon lapse of a predetermined period of time following energization of the same, an energizing circuit for the second device including said last named contacts and a condenser adapted to be charged, and means for supplying charging current to both said condensers.

5. An electrical system for effecting operations in response to receipt of light pulsations, a photoelectric tube adapted to receive light pulsations, electronic amplifying means having its input coupled to the photoelectric tube, said amplifying means being responsive to electrical pulses of the same frequency as the frequency of the light pulsations, a device having a winding adapted to be energized in response to receipt of light pulsations by said photoelectric tube, a thyratron, an energizing circuit for the winding of said device including a condenser and the plate to cathode path of said thyratron, both the condenser and said path being connected in series with said winding, said condenser when discharged through the plate to cathode path of the thyratron serving to momentarily energize said device, means for supplying charging current to said condenser, said thyratron being provided with a control grid in addition to its plate and cathode, and means serving to couple the control grid of said thyratron to the output of said amplifying means for instantaneous application of amplified firing voltage to said grid responsive to receipt of light pulsations by said photoelectric tube.

DAVID PACKARD.
NORMAN B. SCHROCK.

REFERENCES CITED

The following references are of record in the file of this patent:

UNITED STATES PATENTS

| Number | Name | Date |
|---|---|---|
| 1,980,294 | Ross et al. | Nov. 13, 1934 |
| 2,139,489 | Cockrell | Dec. 6, 1938 |
| 2,216,575 | Seinfeld et al. | Oct. 1, 1940 |
| 2,356,266 | Ogilvie | Aug. 22, 1944 |
| 2,387,952 | Smith | Oct. 30, 1945 |
| 2,416,595 | Reynolds | Feb. 25, 1947 |
| 2,432,084 | Blair | Dec. 9, 1947 |
| 2,433,856 | Marihart | Jan. 6, 1948 |